United States Patent [19]

Hahne

[11] 4,028,831

[45] June 14, 1977

[54] SERVICE INDICATING DEVICE

[76] Inventor: Asger K. Hahne, 160 Broadway, Batavia, Ohio 45103

[22] Filed: Oct. 9, 1975

[21] Appl. No.: 621,038

[52] U.S. Cl. .............................. 40/130 K; 40/63 R
[51] Int. Cl.² ......................................... G09F 13/18
[58] Field of Search ........ 40/63 R, 78, 19.5, 130 K, 40/132 D; 312/223, 234, 237, 330; 240/1 EL

[56] References Cited

UNITED STATES PATENTS

| 107,089 | 9/1870 | Nash | 40/63 X |
|---|---|---|---|
| 1,822,878 | 9/1931 | Bauder | 40/78 |
| 3,213,269 | 10/1965 | Melvin et al. | 240/1 EL |
| 3,442,039 | 5/1969 | Saizelet | 312/223 X |

*Primary Examiner*—John F. Pitrelli
*Attorney, Agent, or Firm*—James W. Pearce; Roy F. Schaeperklaus

[57] ABSTRACT

A service indicating device which includes a casing and a drawer slidably received in the casing. The drawer has a transparent front panel. Indicator element blocks are mounted in the drawer tandemwise with a front face of one of the indicator element blocks adjacent the front panel of the drawer to be viewed through the front panel. Top faces of the indicator element blocks are exposed when the drawer is open. There is indicia on front faces of the indicator element blocks to indicate the time for a service operation. Indicia on top faces of the indicator element blocks indicate the order for the blocks.

3 Claims, 9 Drawing Figures

SERVICE INDICATING DEVICE

This invention relates to a device for indicating the scheduling of repetitive operations. More particularly, the invention relates to a device for indicating the time for service of an automobile or the like.

An object of this invention is to provide a service indicator which includes a display which is clearly visible are which can be charged as service operations are performed.

A further object of this invention is to provide such a service indicator on which indicator elements are readily changed, and in which only one of a plurality of indicator elements is displayed at one time, with a new indicator element being displayed when each indicator element is removed for changing.

A further object of this invention is to provide such a service indicator in which there is a plurality of indicator elements, and each indicator element can be revised as repetitive service operations are performed.

Briefly, this invention provides a service schedule indicator which includes a drawer that can be mounted on the dashboard or the like of an automobile. A plurality of indicator element blocks is mounted in tandem inside the drawer. The drawer is provided with a window in a front wall thereof through which a face of a leading one of the indicator elements is viewed. When an indicator element is to be changed, the drawer is opened, and the leading element is withdrawn through an opening in a side wall of the drawer. Ends of the indicator elements are pointed so that the element which has been withdrawn can be inserted in proper position among the other indicator elements after indicia thereon has been updated following a service operation.

The above and other objects and features of the invention will be apparent to those skilled in the art to which this invention pertains from the following detailed description and the drawings, in which.

In the following detailed description and the drawings, like reference characters indicate like parts.

Figure 1:
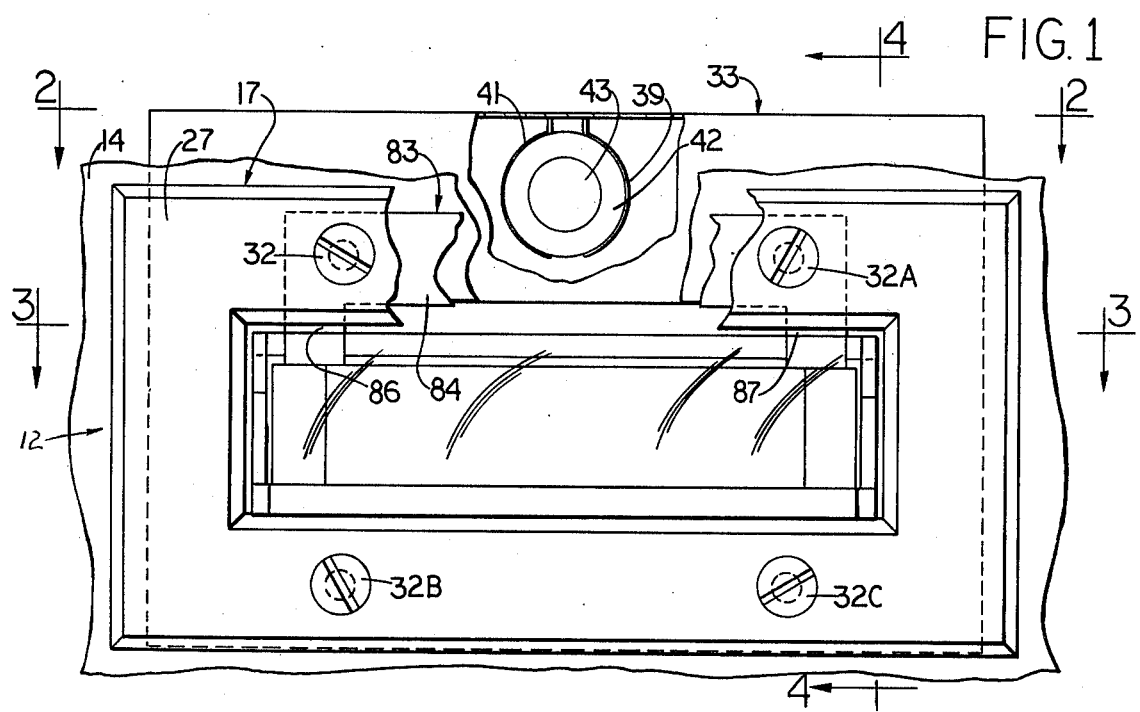
FIG. 1 is a view in front elevation of a service indicating device constructed in accordance with an embodiment of this invention, a fragmentary portion of a dashboard panel of an automobile being shown in association therewith, parts being broken away to reveal details of structure.

In FIG. 1 is shown a service indicating device 12 constructed in accordance with an embodiment of this invention. The device 12 is mounted on an upright panel 14 of an automobile dashboard, only a fragmentary portion of which is shown. The panel 14 is provided with a rectangular opening 16 (FIGS. 3 and 4) in which a casing 17 of the device is mounted. The casing 17 includes a lower horizontal panel 18 (FIG. 4), an upper horizontal panel 19, a first upright panel 21 (FIG. 3), a second upright panel 22, and an inner upright panel 23. The panel 23 spans the panels 18, 19, 21, and 22 to form a socket 26 of rectangular cross section in the casing 17. An annular flange 27 is formed on outer edges of the panels 18, 19, 21, and 22. The annular flange 27 can be attached to an outer face 31 of the dashboard panel 14 by fasteners 32, 32A, 32B, and 32C (FIG. 1). The fasteners 32, 32A, 32B, and 32C also serve to mount a bracket 33 on an inner face 34 of the dashboard panel 14. The bracket 33 includes an upright panel 36 (FIG. 4), which is held in face-to-face relation with the inner face 34 of the dashboard panel 14 by the fasteners 32, 32A, 32B, and 32C, and a generally horizontal panel 38. Portions 39 and 41 of the panel 38 are deformed downwardly to form a socket for a fixture 42 which supports a lamp 43. A rectangular opening 46 in the panel 36 receives the casing 17.

Figure 9:
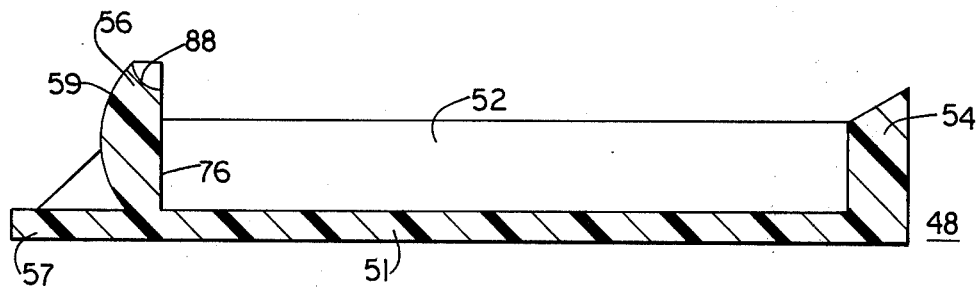
FIG. 9 is a view in section of a drawer of the device taken on the line 9—9 in FIG. 3.

A drawer 48 is slidably received in the socket 26. The drawer 48 includes a bottom panel 51 (FIG. 9), side panels 52 and 53 (FIGS. 3 and 4), a rear panel 54, and a front panel 56. An extension portion 57 of the bottom panel 51 extends outwardly to provide a handle for the drawer 48. The drawer 48 can be formed of transparent plastic material. A front face 59 of the front panel 56 can be formed as a plano-convex lens, as shown in FIG. 9.

Figure 3:
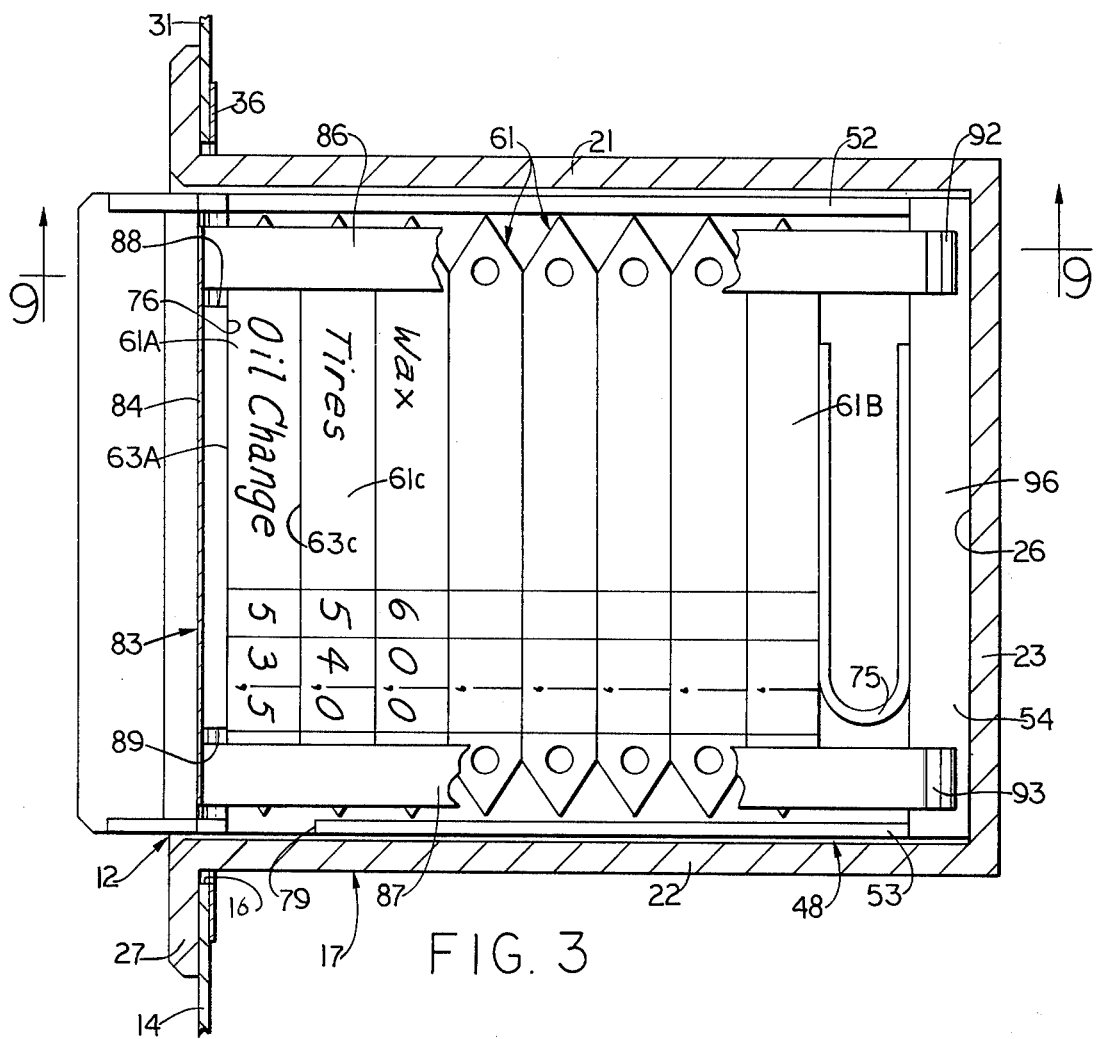
FIG. 3 is a view in section taken generally on the line 3—3 in FIG. 1.
Figure 5:
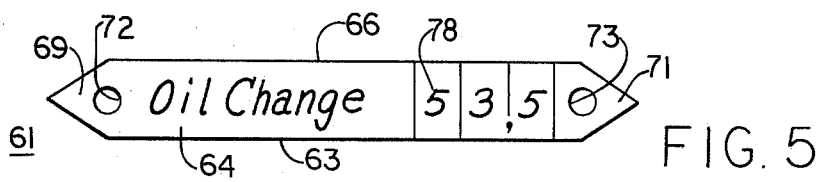
FIG. 5 is a top plan view of an indicator element of the device shown in FIGS. 1–4, inclusive.

The drawer 48 is constructed to hold a plurality of indicator element blocks 61 (FIG. 3). Details of construction of one of the indicator elements 61 are shown in FIGS. 5–8, inclusive. The indicator element 61 is formed of a block of translucent plastic material and includes a front face 63, a top face 64, a rear face 66 and a bottom face 67. Appropriate indicia can be provided on the faces of the indicator element 61. End portions 69 and 71 of the indicator element 61 are pointed, as shown in FIGS. 5 and 7. Sockets 72 and 73 are formed in the top face 64 adjacent the end portions 69 and 71, respectively.

The indicator elements 61 are mounted tandemwise in the drawer 48 as shown in FIG. 3, and indicia on a front face 63A of an indicator element 61A can be observed through the front panel 56 of the drawer 48. A spring member 75, which bears on the rear panel 54 and on an indicator element 61B, holds the indicator elements in position in the drawer 48 with the front face 63A flatwise against an inner face 76 of the front panel 56. A front face 63C of an indicator element 61C is flatwise against the element 61A so that, when the element 61A is removed, the element 61C can move forward to bring the face 63C into engagement with the inner face 76 of the front panel 56 of the drawer 48 so that indicia on the indicator element 61C can be viewed.

Figure 4:
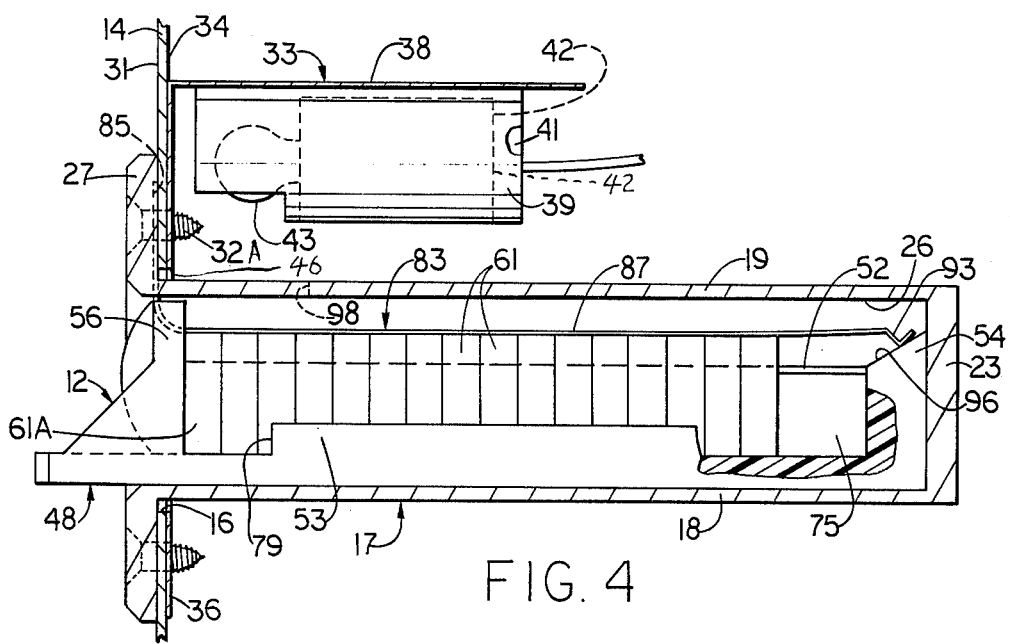
FIG. 4 is a view in section taken on the line 4—4 in FIG. 1.
Figure 6:
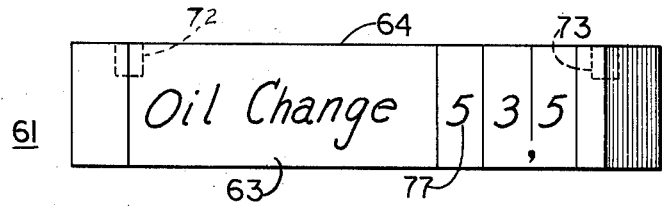
FIG. 6 is a view in side elevation of the indicator element shown in FIG. 5.
Figure 7:
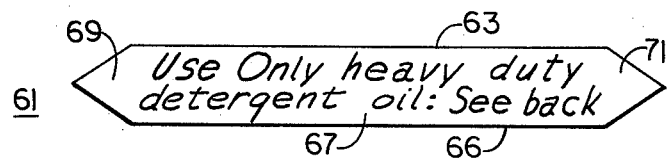
FIG. 7 is a bottom plan view of the indicator element shown in FIGS. 5 and 6.
Figure 8:
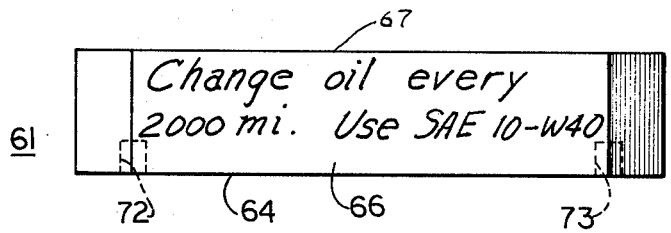
FIG. 8 is another view in side elevation of the indicator element shown in FIGS. 5–7, inclusive.

As shown in FIG. 6, the element 61 can have indicia 77 on the front face 63 showing that an oil change is due at a particular mileage, the mileage being shown in thousands of miles. Similar indicia 78 can be disposed on the top face 64, as shown in FIG. 5. Faces of the indicator elements can be roughened so that numerals of the indicia can be written in pencil, and the numerals can be erased and replaced with new numerals to indicate the next time for the service operation called for by the indicator element. Then the indicator element is replaced in the drawer 48 in proper position with the mileages being successively higher as the blocks progress from the front panel 56 of the drawer 48 so that it will be in the front of the drawer when the service operation is next due. When the drawer 48 is opened, the indicator element 61A adjacent the front panel 56 of the drawer 48 can be withdrawn through a slot 79 (FIGS. 3 and 4) in the side panel 53 when the drawer 48 is in open position. A stylus (not shown) such as a pencil can be inserted in one of the sockets 72 and 73 (FIG. 5) to assist in removing the indicator element. When the indicia on the indicator element have been revised, the indicator element can be inserted in proper position with the end portion 69 entering between end portions of other indicator elements. As shown in FIG. 4, the side panel 53 is sufficiently low that upper sections of the end portions of the indicator elements extend upwardly above the side panel 53 so that the indicator element that has been removed can be inserted readily between other indicator elements.

Figure 2:
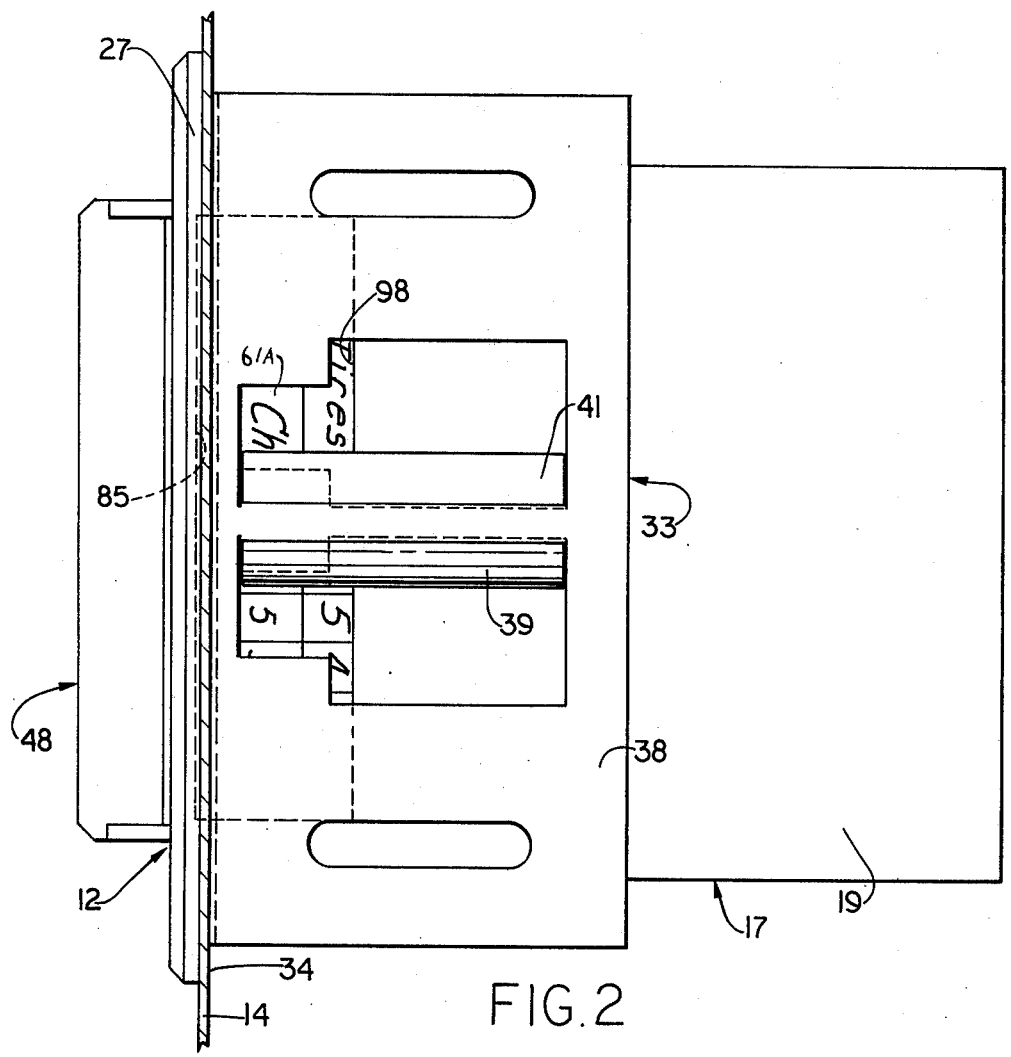
FIG. 2 is a view in section taken on the line 2—2 in FIG. 1.

The indicator elements 61 are held in position in the drawer 48 by a spring member 83 (FIGS. 1, 3, and 4). As shown in FIGS. 1 and 3, the spring member 83 includes a cross portion 84, which is received in a slot 85 (FIGS. 2 and 4) in an upper portion of the flange 27 of the casing 17. The fasteners 32 and 32A extend through openings (not shown) in the cross portion 84, and the cross portion 84 is gripped in the slot 85 between the flange 27 and the upright panel 14. Spring arms 86 and 87 (FIG. 3) extend from the cross portion 84. The spring arms 86 and 87 extend through slots 88 (FIGS. 3 and 9) and 89 (FIG. 3), respectively, in the front panel 56 of the drawer 48 and overlie the indicator elements 61 in the drawer 48 to hold the indicator elements 61 in the drawer 48, as shown in FIG. 4. When the drawer 48 is fully closed, end portions 92 and 93 of the spring arms 86 and 87, respectively, engage a sloping upper face 96 of the rear panel 54 to hold the drawer 48 in closed position.

A slot 98 (FIGS. 2 and 4) is provided in the top panel 19 of the casing 17 under the lamp 43 (FIG. 4) and overlying the indicator element 61A, which is adjacent the front panel 56 of the drawer 48 when the drawer 48 is closed, so that the lamp 43 illuminates the indicator element 61A.

The service schedule indicator illustrated in the drawings and described above is subject to structural modification without departing from the spirit and scope of the appended claims.

Having described my invention, what I claim as new and desire to secure by letters patent is:

1. A service indicating device which includes a casing, a drawer slidably received in the casing, said drawer having a transparent front panel, a plurality of indicator element blocks of translucent material mounted in the drawer tandemwise with a front face of one of the indicator element blocks adjacent the front panel of the drawer, indicia on front faces of the indicator element blocks for viewing through the front panel of the drawer, and a lamp mounted above the drawer and arranged to illuminate the one of the indicator element blocks having its face adjacent the front panel of the drawer.

2. A service indicating device which includes a casing, a drawer slidably received in the casing, said drawer having side panels and a transparent front panel, a plurality of indicator element blocks mounted in the drawer tandemwise with a front face of one of the indicator element blocks adjacent the front panel of the drawer, indicia on front faces of the indicator element blocks for viewing through the front panel of the drawer, there being a slot in one of the side panels of the drawer adjacent the front panel of the drawer, and the one of the indicator element blocks having its front face adjacent the front panel of the drawer being withdrawable from the drawer sidewise of the drawer through the slot when the drawer is open.

3. A service indicating device which includes a casing, a drawer slidably received in the casing, said drawer having side panels and a transparent front panel, a plurality of indicator element blocks mounted in the drawer tandemwise with a front face of one of the indicator element blocks adjacent the front panel of the drawer and with top faces of the indicator element blocks being exposed when the drawer is open, the indicator element blocks being provided with end portions which are pointed, indicia on front faces of the indicator element blocks for viewing through the front panel of the drawer, the end portions of the indicator element blocks extending upwardly above at least one of the side panels of the drawer so that one of the end portions of one of the indicator element blocks can be inserted between end portions of others of the indicator element blocks when the drawer is open for insertion of said one of the indicator element blocks in position in the drawer.

* * * * *